US006625474B1

(12) United States Patent
Bussan et al.

(10) Patent No.: US 6,625,474 B1
(45) Date of Patent: Sep. 23, 2003

(54) METHOD AND APPARATUS FOR AUDIO SIGNAL BASED ANSWER CALL MESSAGE GENERATION

(75) Inventors: Christopher Frank Bussan, Mundelein, IL (US); Donald Arthur Dorsey, Vernon Hills, IL (US); Charles Philipp Binzel, Bristol, WI (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/546,779

(22) Filed: Apr. 11, 2000

(51) Int. Cl.[7] ................................................ H04B 1/38
(52) U.S. Cl. ........................ 455/563; 455/79; 455/567
(58) Field of Search .......................... 455/563, 79, 567, 455/412.1, 550, 412.2, 414.1; 379/67.1, 68–76, 88.01, 373.01, 373.04, 374.02, 88.26, 88.22; 375/365; 370/527, 215; 340/500, 504

(56) References Cited

U.S. PATENT DOCUMENTS

| 4,525,793 A | * | 7/1985 | Stackhouse .............. 364/513.5 |
| 5,175,759 A | * | 12/1992 | Metroka et al. ............... 379/58 |
| 5,581,604 A | * | 12/1996 | Robinson et al. .............. 379/67 |
| 5,630,205 A | * | 5/1997 | Ekelund ...................... 455/54.1 |
| 5,646,945 A | * | 7/1997 | Bergler ........................ 370/419 |
| 5,661,782 A | * | 8/1997 | Bartholomew et al. ........ 379/67 |
| 5,703,931 A | | 12/1997 | Martensson ................... 379/58 |
| 5,719,921 A | | 2/1998 | Vysotsky et al. .............. 379/88 |
| 5,854,826 A | * | 12/1998 | Kim ............................. 379/68 |
| 5,963,639 A | * | 10/1999 | Kanamaki .................... 379/418 |
| 6,173,041 B1 | * | 1/2001 | Borland et al. ............. 379/67.1 |
| 6,424,822 B1 | * | 7/2002 | Mekuria et al. ............... 455/72 |

FOREIGN PATENT DOCUMENTS

| WO | WO 99/29091 | * | 6/1999 | ............ H04M/3/50 |

OTHER PUBLICATIONS

RD 422,031, "real time message response . . .", Jun. 10, 1999, 1 page attached to the search report.*

* cited by examiner

Primary Examiner—Edward F. Urban
Assistant Examiner—C. Chow
(74) Attorney, Agent, or Firm—Shigeharu Furukawa; Hisashi D. Watanabe

(57) ABSTRACT

A wireless communication apparatus (100) and communication method provides an audio-based call connection operation. For example, one method includes receiving an incoming call message (108) and receiving an input audio answer signal (120), such as a user's voice, in response to the incoming call message (108). This method includes detecting an amplitude or characteristic of the input audio answer signal (120) and sending an answer call message (126) based on the detected amplitude level of the input audio answer signal (120). In another embodiment, the process includes storing the input audio answer signal (120) as preconnection audio information (304b) and subsequently sending the preconnection audio information (304b) as a post connection greeting. For example, a user saying the word "hello," completes the call without any additional greeting required. In another embodiment, prestored audio greeting information, such as key word templates, is used to compare with the input audio answer signal (120) to determine whether to send the answer call message (126) to complete the call connection.

20 Claims, 6 Drawing Sheets

METHOD AND APPARATUS FOR AUDIO SIGNAL BASED ANSWER CALL MESSAGE GENERATION

FIELD OF THE INVENTION

The invention relates generally to wireless communication systems and methods and more particularly to wireless communication systems and methods that provide a call connection based on audio commands.

BACKGROUND OF THE INVENTION

Wireless telephone appliances, such as mobile radiotelephones, hand held Internet appliances, laptop computers, and any other suitable communication device typically require the pressing of a button or a key to answer a phone call. This can be cumbersome and bothersome and even dangerous when tried in a car or during other activity since key pressing requires additional manual tasks and eye concentration to effect the answering of a call. In addition, when key presses are used for a key based answer to respond to an incoming call message to complete a call connection, a key is pressed before the phone is near the face. In noisy environments, such as in an automobile, it is undesirable to answer the call before the phone is near the face since noise can be heard by the calling party before the actual greeting is sent.

One solution for wireless radiotelephones has been to provide a speech recognizer, which recognizes an answer command. For example, in response to an incoming call message (resulting in the ringing of the phone) a user may state the word "answer" after which time an answer call message is sent to complete the call. After the call is completed, the user then responds with a greeting such as "hello" or any other suitable greeting. However, in such systems, the answer command is not communicated to the call party. Accordingly, an additional greeting step is required.

Accordingly, there exists a need for a wireless communication apparatus and method that provides audio based answer call messaging without requiring additional greeting information.

DETAILED DESCRIPTION OF THE PREFERRED EMBODIMENTS

Briefly, a wireless communication apparatus and communication method provides an audio-based call connection operation. An audio greeting triggers the setup command, such as an answer call message, for the wireless infrastructure as well as serving as the greeting that is sent to the calling party after the call is connected. For example, one method includes receiving an incoming call message and receiving an input audio answer signal, such as a user's voice, in response to the incoming call message. The method includes detecting an amplitude or other characteristic of the input audio answer signal and sending an answer call message based on the detected amplitude level of the input audio answer signal. In another embodiment, the process includes storing the input audio answer signal as preconnection audio information and subsequently sending the preconnection audio information in addition to, or as part of the answer call message. The input audio answer signal triggers sending of the answer call message for the infrastructure to complete the connection and also serves as the greeting that is sent to the calling party. For example, a user saying the word "hello," completes the call without any additional greeting required. In another embodiment, prestored audio greeting information, such as prestored keywords, is used to compare with the input audio answer signal to determine whether to send the answer call message to complete the call connection.

In one embodiment amplitude detection is used to determine whether the input audio answer signal is the greeting. If so, the input audio answer signal serves as the command to initiate call setup using an answer call message. Alternatively, a speech recognizer may be used to determine whether the input audio answer signal should trigger an answer call message, and becomes a greeting that is also sent to the calling party as a post connection greeting.

Figure 1:
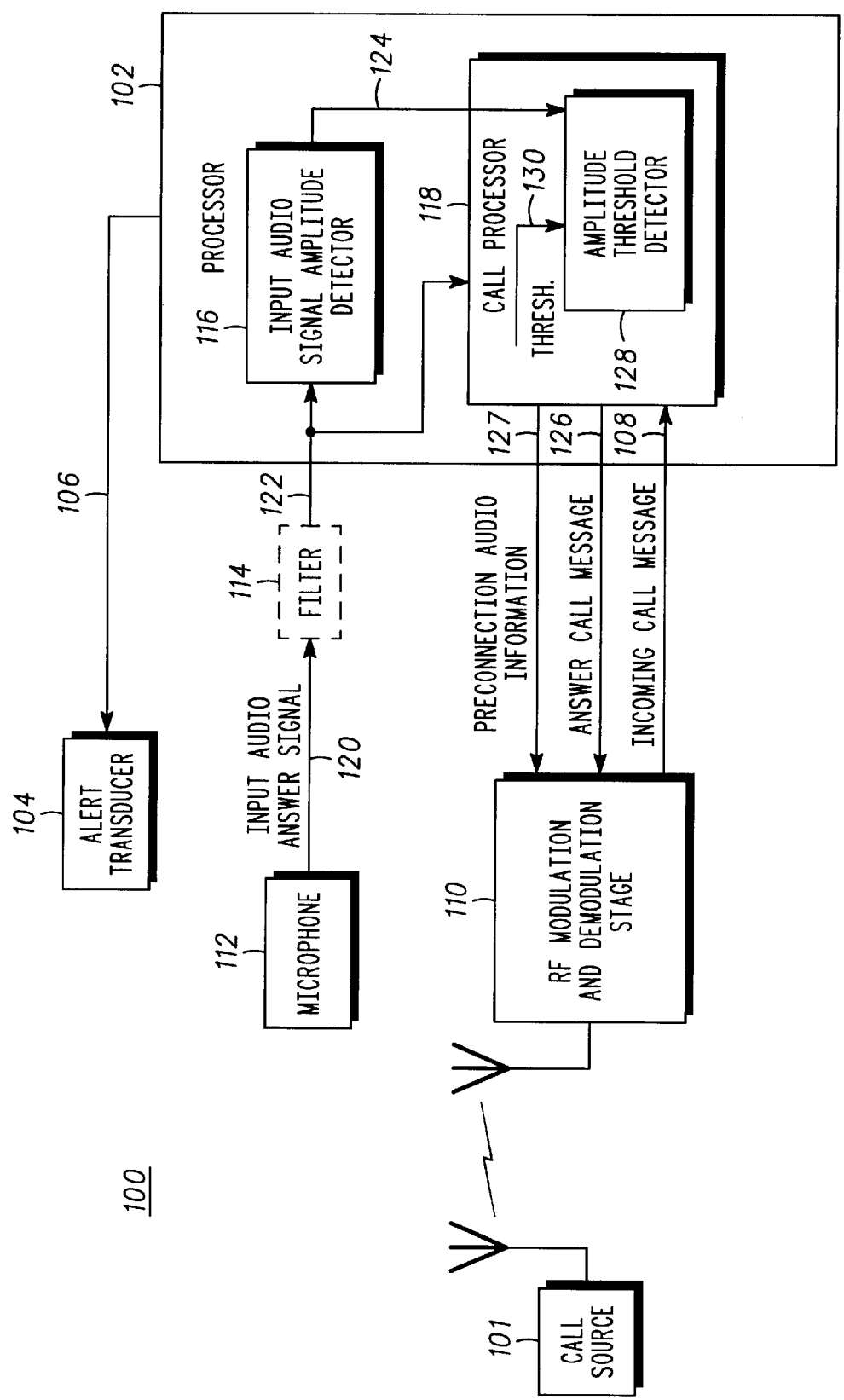
FIG. 1 is a block diagram illustrating one example of a wireless communication apparatus in accordance with one embodiment of the invention.

FIG. 1 illustrates an example of a wireless communication apparatus 100 that includes a processor 102, such as one or more microprocessors, digital signal processors, discrete logic or any other suitable structure. The wireless communication apparatus 100 may be part of a radiotelephone appliance, Internet information appliance, or any other suitable apparatus. The wireless communication apparatus 100, for purposes of illustration, and not limitation, will be referred to as a mobile radiotelephone. The wireless communication apparatus 100 includes an alert transducer 104, such as a vibrator, speaker or display screen, which provides an alert to a user that an incoming call is being received. For example, the alert transducer 104 may provide a ring when an incoming call message is received. Accordingly, the processor 102 generates an audio alert input signal 106, such as a signal indicating a particular tone if the alert transducer is a speaker or other signal to activate the alert transducer 104. The alert transducer 104 may be an audio transducer, such as a speaker, and is operative to output an audio alert, such as an audible output, in response to an incoming call message 108 received through an RF modulation/demodulation stage 110 from a call source 101. The RF modulation/demodulation stage 110 may be any conventional RF stage that provides suitable modulation and demodulation as required. The incoming call message 108 may be sent by a wireless or non-wireless communication apparatus as known in the art, The wireless communication apparatus 100 also includes a microphone 112, and if desired, an audio filter 114. The processor 102 includes an input audio signal amplitude detector 116 and a call processor 118. The call processor 118 may be a suitable software module, hardware, or any other suitable structure. One of the functions of the call processor 118 is to perform conventional call process handling, as known in the art, such as communicating network signaling call control messages used for call setup such as answer call message 126, connection complete messages and other conventional messages. However, unlike conventional call processors the call processor 118 also outputs preconnection audio information 127 as described below.

The input audio signal amplitude detector 116 detects an amplitude of an input audio answer signal 120 received from the microphone 112. The input audio answer signal 120 may be, for example, a user's voice or other input audio that is generated in response to the audio alert generated by the alert transducer.

In this embodiment, the filter 114 may be any suitable noise filter which filters noise including the audio alert generated by the alert transducer such that the input audio signal amplitude detector 116 receives the filtered input audio answer signal 122. However, it will be recognized that any suitable filtering may be desired. The amplitude detector 116 may be any suitable amplitude detector as known in the art and may be programmable to be set to any suitable threshold.

The call processor 118 is operatively coupled to the input audio signal amplitude detector 116 to receive an amplitude level 124 to initiate an answer call message. The call processor 118 is also operative to send an answer call message 126 in response to the incoming call message 108. The call processor 118 sends the answer call message 126 based on a detected amplitude level 124 of the input audio answer signal 120. The answer call message 126 may take any suitable form. The answer call message 126 may contain conventional control signaling information to notify the infrastructure that the user wishes to complete a call. The preconnection audio information 127 may be sent as the post connection greeting in a separate message following the sending of an answer call message. Alternatively, the answer call message 126 can be a post connection greeting in a single message. The call processor 118 also receives the filtered input audio answer signal 122, such as a preconnection greeting like the word "hello", for formatting and outputs the preconnection signal as preconnection audio information 127.

The input audio answer signal 120 may be voice information or other audio information that is provided in response to the incoming call message 108. The answer call message 126 is sent based on the voice information instead of a key based answer call message. For example, a user need not depress any key on a keypad to answer a call when, for example, the wireless communication apparatus 100 rings indicating an incoming call. Instead, the user merely says a greeting, through microphone 112, such as the word "hello." As long as the greeting is of suitable strength as detected by the amplitude detector, the call processor 118 will generate the answer call message 126 to indicate a connection should be completed. The preconnection audio information 127 is also sent as a separate message. However, the answer call message 126 may include not only control information but can also include the preconnection information 127, if desired (e.g., voice data is part of control messaging). In any event, the input audio answer signal, such as the word "hello", serves to commence the answer call message and may be sent with the answer call message as preconnection audio information 127 at any suitable time to the calling party for use as the post connection greeting. In this way, no key press or other activation procedure is needed.

To avoid noise from inadvertently indicating a call answer, the call processor 118 includes an amplitude threshold detector 128 that receives a programmable threshold 130. The amplitude threshold detector 128 compares the amplitude level 124 output from the amplitude detector 116 with the threshold 130 to determine whether a suitable amplitude of the input audio answer signal 120 is present. Accordingly, non-speech information may also be used to complete a call to avoid a key-based response. The threshold detector 128 may be a digital or analog comparator circuit, or any other suitable threshold detection logic, software, hardware, or any suitable combination.

The call processor 118, in one embodiment, sends the answer call message 126 in response to a detection of an increase in input audio answer signal amplitude. For example, the amount of increase in amplitude level 124 may indicate that the call answer message 126 should be generated based on the input audio answer signal 120. This serves as an active threshold detection to insure that background noise does not serve to generate an answer call message.

Figure 2:
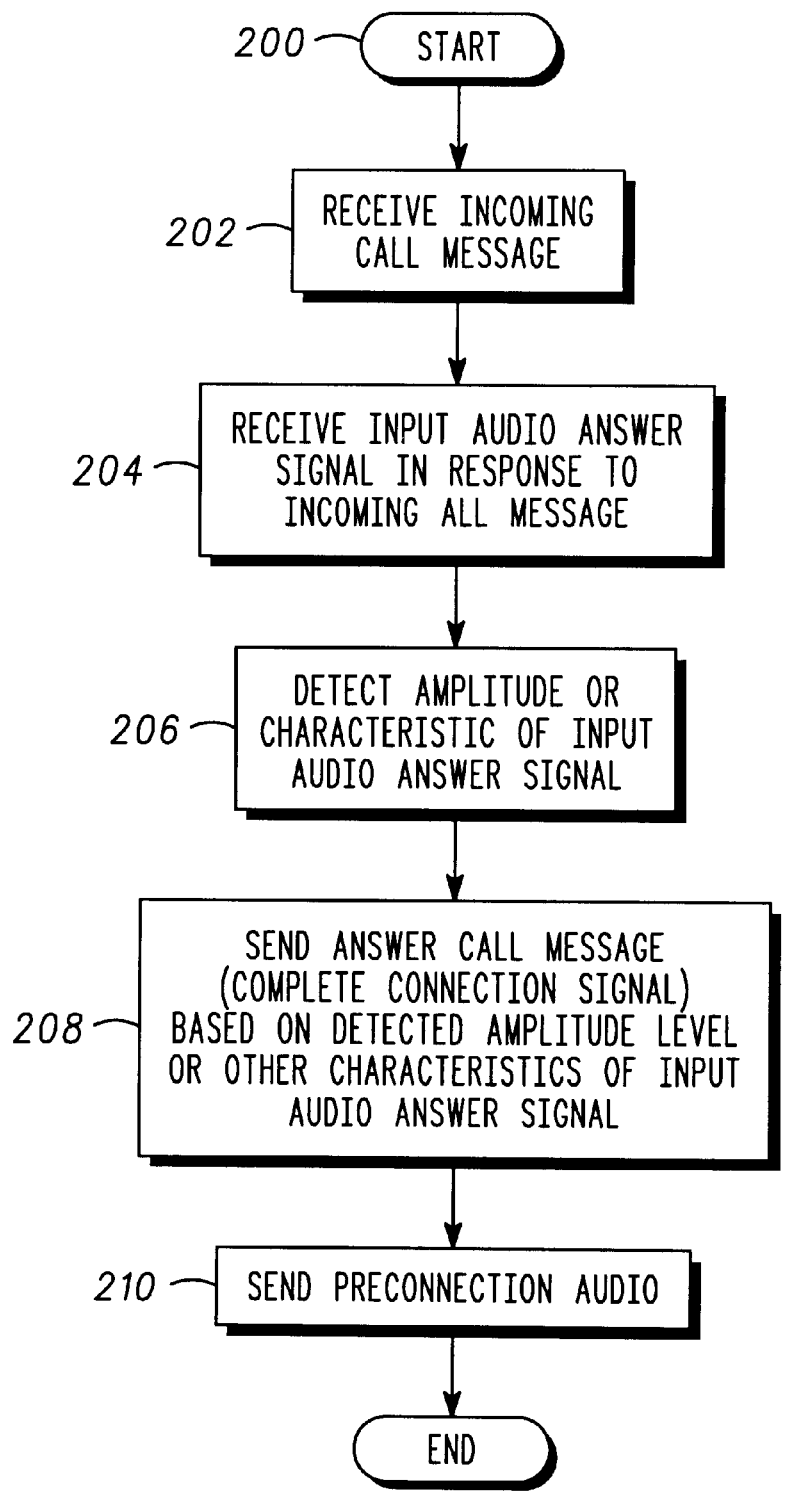
FIG. 2 is a flowchart illustrating one method of communication in accordance with one embodiment of the invention.

FIG. 2 illustrates one example of a communication method in accordance with the invention which starts in block 200 with the demodulation of incoming call message. As shown in block 202, the method includes receiving an incoming call message. In response to receiving the incoming call message, the alert transducer generates the alert signal (e.g., sound). The method includes receiving the input audio answer signal, as shown in block 204, in response to the incoming call message 108. The input audio answer signal may be any suitable speech or non-speech audio signal. As shown in block 206, the method includes detecting an amplitude of the input audio answer signal. In block 208, the method includes sending an answer call message based on the detected amplitude level of the input audio answer signal. The answer call message serves as the answer set up command. As shown in block 210, the input audio answer signal, which is preconnection audio, is sent in a separate message as the greeting that is received by the calling party. The audio alert is generated in response to the incoming call message, and if desired, the method may include filtering the audio alert from the input audio answer signal 120 so that the ringing of the telephone, for example, does not wash out the input audio answer signal 120.

Figure 3:
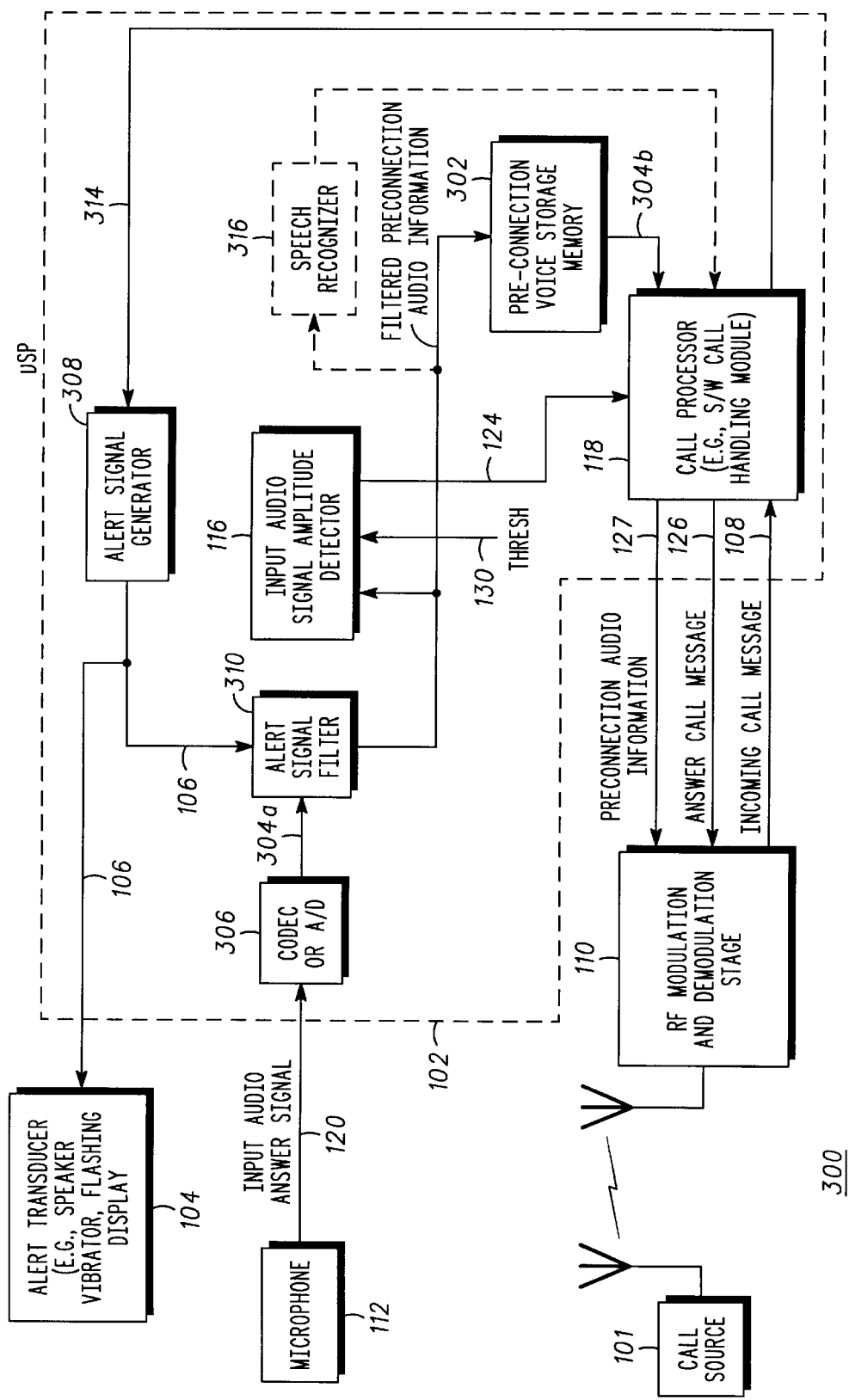
FIG. 3 is a block diagram of another embodiment of a wireless communication apparatus in accordance with another embodiment of the invention.

FIG. 3 shows another embodiment of a wireless communication apparatus 300 that includes memory 302 that is operatively coupled to the call processor 118. The codec 306 digitizes the input audio answer signal 120 to produce digital preconnection audio information 304a. The memory 302 is preconnection voice storage memory that contains filtered preconnection audio information 304b such as the input audio answer signal 120 in filtered digital form, or a function thereof. The call processor 118 sends the filtered stored preconnection audio information 304b stored in the memory 302 in addition to sending the answer call message 126. For example, the filtered stored preconnection audio information 304b may be the audible greeting "hello" which is formatted as required by the infrastructure to form the preconnection audio information 127 that is sent as a separate message from the answer call message but may be combined as a common message to be sent at the same time.

The detection of the input audio answer signal triggers sending of the answer call message 126. As noted, the preconnection audio information 127 may alternatively become the answer call message. When the preconnection audio is combined with the answer call message, the resulting message serves as both the answer call command for the infrastructure indicating that the call should be completed, and also contains the greeting information that is transmitted to the calling party so that no additional steps are required by a user other than to audibly say "hello." Alternatively, the answer call message can be eliminated and the preconnection audio can serve the dual purpose of an answer call command and greeting information to avoid sending signaling information. Hence the preconnection information serves as the answer call message. The network would then decode the transmission as a completed call and send the audio to the desired destination.

The wireless communication apparatus 300 also includes, in this embodiment, a codec or analog to digital converter (A/D) 306, an alert signal generator 308, and an alert signal filter 310. The alert signal filter 310 receives the digital preconnection audio information 304a and the alert signal 106. The alert signal filter 310 filters out the alert signal as-received by the microphone 112 to produce the filtered preconnection audio information 304b for storage.

Figure 4:
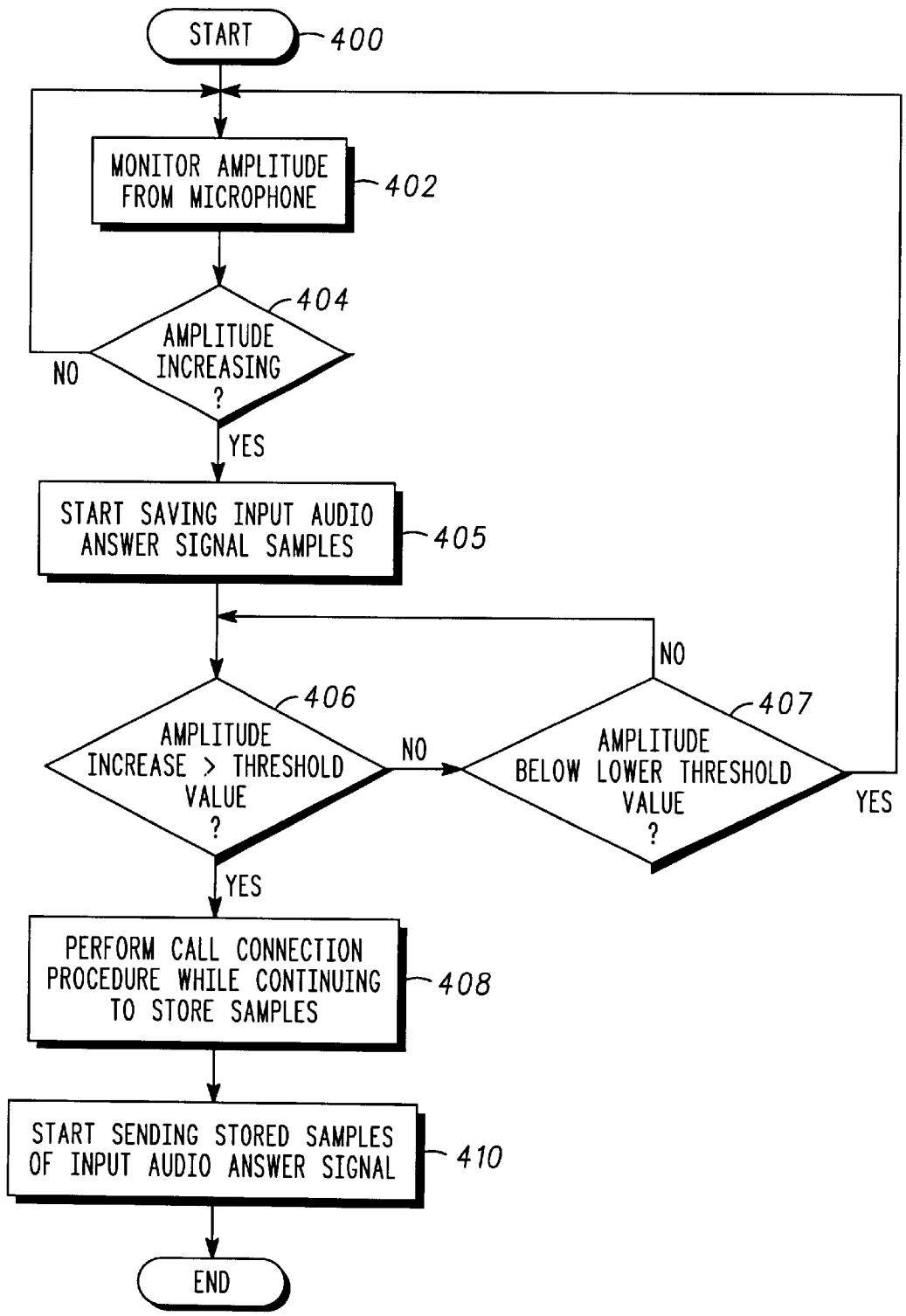
FIG. 4 is a flowchart illustrating another wireless communication method in accordance with another embodiment of the invention.

Referring also to FIG. 4, the wireless communication apparatus 100 or the wireless communication apparatus 300 may operate as indicated in block 400, where the wireless communication apparatus receives the incoming call message 108 to detect an incoming call as shown in block 400. As shown in block 402, the amplitude of the input audio answer signal 120 from the microphone 112 is monitored by amplitude detector 116. The codec or A/D 306 converts the input audio answer signal 120 to a digital input audio answer signal also referred to as the digital preconnection audio information 304a. As shown in block 404, the processor 102 determines if the amplitude of the input audio answer signal 120 is increasing. As shown in block 405, the process includes starting to save the input audio answer samples. If the amplitude is detected as increasing, the processor 102 determines if the amplitude level has increased beyond a selected upper threshold. If not, the process includes determining if the amplitude is below a lower threshold as shown in block 407. If so, the process includes continuing to monitor the microphone. However, if the amplitude is less than the upper threshold but not lower than a lower threshold, the process includes continuing to save input audio samples.

Referring again to block 406, if the amplitude has increased beyond the upper threshold, the process includes performing the call connection procedure which includes sending the answer call message 126 as shown in block 408. This is done while continuing to save input audio answer signal samples. As shown in block 410, the process includes sending the preconnection audio information 127 which, in one embodiment, includes sending the samples of the input audio answer signal 120 that are stored as filtered preconnection audio information 304b.

Referring again to FIG. 3, the alert signal generator 308 is controlled by an alert control signal 314 by the call processor 118 to generate a defined tone, such as an answer ring. The alert signal filter 310 receives the audio alert input signal 106 representing the frequency generated by the alert transducer 104 so that the alert signal filter 310 may filter out this information from the input audio answer signal 120 before detection by the amplitude detector 116. The output of the alert signal filter 310 serves as the filtered input audio answer signal 304b which is then stored in memory 302 as the stored preconnection audio information. Accordingly, when a user receives an incoming call, the user answers the call by speaking into the microphone 112. Whatever is spoken into the microphone before a connection is made is sent to the calling party to initiate the conversation. The input audio answer signal 120 which may be speech or non-speech, is stored in the memory 302 until the call is connected. In this way, the first word that is spoken, or the first sound that is made that exceeds the amplitude threshold, is used as control information to answer the phone and is also used as greeting information to be sent to the calling party. Accordingly, if the input audio answer signal 120 is digitized, samples are stored in memory 302 while monitoring the amplitude.

As shown, if desired, instead of, or in addition to an amplitude detector, a speech recognizer 316 may be used which is operative to analyze the incoming preconnection speech. The memory 302 then contains stored preconnection speech, and the call processor sends the preconnection speech as post connection speech in addition to sending the answer call message.

Figure 5:
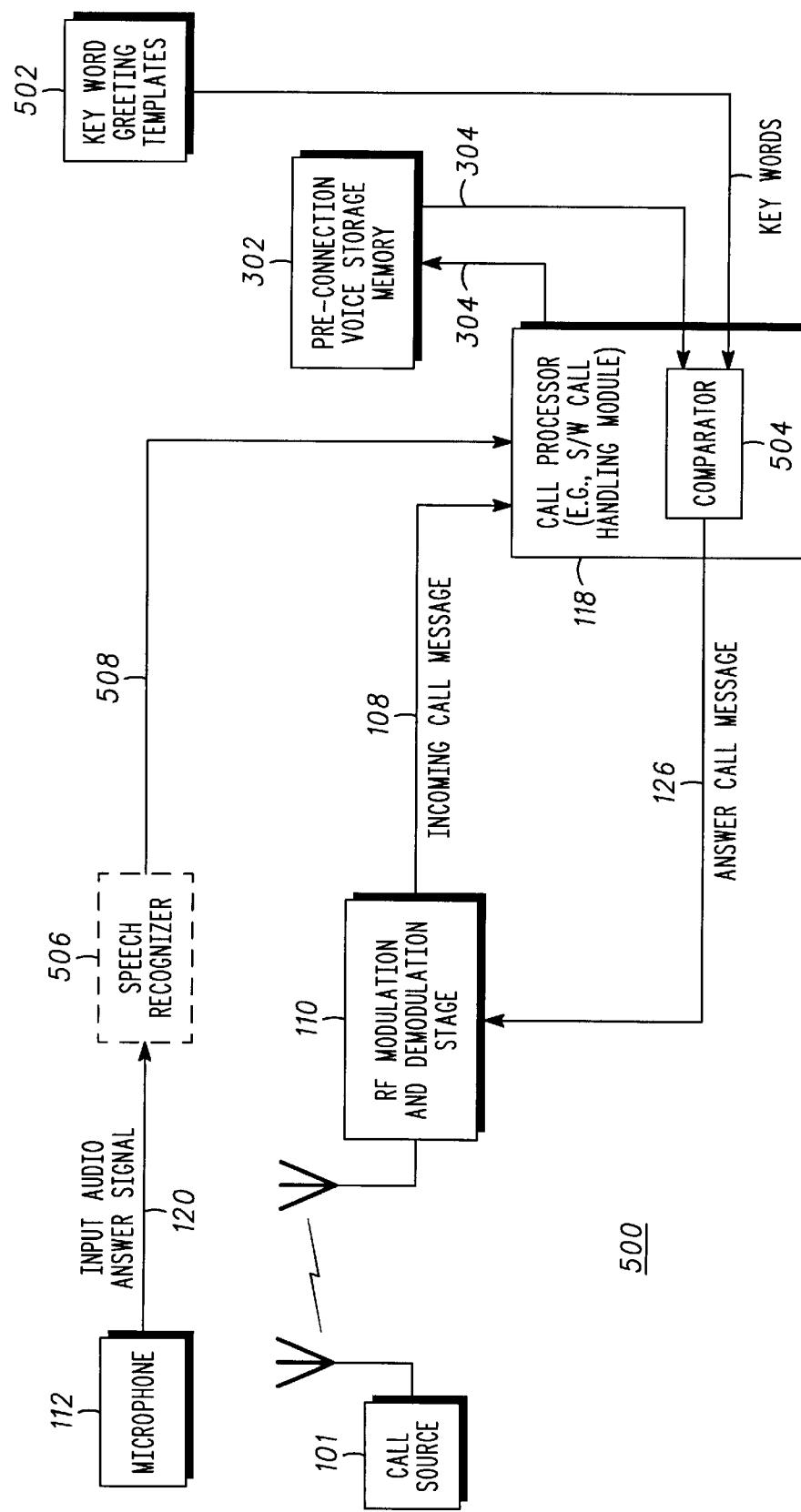
FIG. 5 is a block diagram illustrating another embodiment of a wireless communication apparatus employing a speech recognizer, in accordance with another embodiment of the invention.

FIG. 5 illustrates another embodiment of a wireless communication apparatus 500 that includes memory 502 which contains stored audio greeting information, such as key word templates, key sounds, or any other information that may be compared to the input audio answer signal 120 to determine whether it is proper information to initiate the call completion sequence. A comparator 504 compares at least a portion of the stored preconnection speech 304 to determine whether to send the answer call message 126. For example, where the wireless communication apparatus 500 begins to store the input audio answer signal 120 immediately, the call processor 118 may compare the samples to the stored audio greeting information in memory 502 to determine whether at least a portion of the input audio answer signal is recognized. For example, if a user says the words "hello, how are you?", the call processor 118 may send the answer call message 126 based on the first word "hello" and not wait until the entire greeting is stored. In contrast, the call processor may wait until all of the greeting information is stored and may compare each of the words in the entire greeting to the stored audio greeting information to see if all of the stored SAC preconnection speech matches to determine whether to send the answer call message 126. The preconnection information or the prestored greeting may be sent as the preconnection audio information. Accordingly, the wireless communication apparatus 500 includes a speech recognizer 506 that is operatively connected to the microphone 112 and outputs speech information 508 to call processor 118 which suitably stores the input audio answer speech information 508 in the memory 302 as it is being generated. The stored audio greeting information 502 may be trained reading templates such as the word "hello" as spoken by a particular user, or any other suitable information which is stored and compared to the incoming preconnection speech. The speech information 508 is preconnection speech since it is being spoken prior to the answer call message being communicated (prior to a connection existing).

Figure 6:
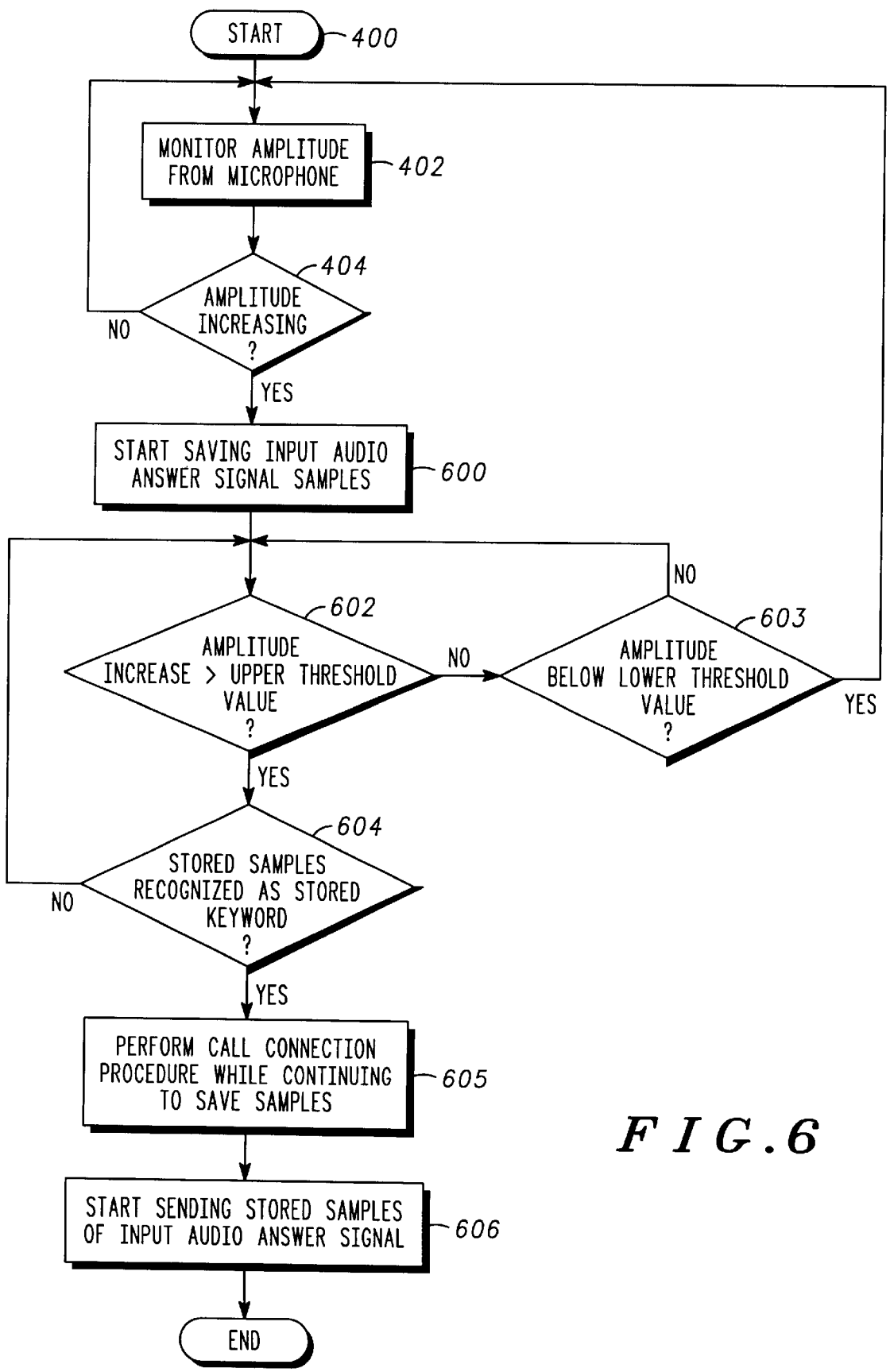
FIG. 6 is a flowchart illustrating another method of communication in accordance with another embodiment of the invention.

As illustrated in FIG. 6, the wireless communication apparatus 500 after determining that the amplitude is increasing, may then save the samples of the speech for the speech recognizer 316 as shown in block 600. If the amplitude is detected to have increased beyond a desired upper threshold, as shown in block 602, the process includes comparing stored audio greeting information (key word templates) to at least a portion of the stored preconnection audio information (input audio answer signal) to determine whether to send an answer call message. This is shown in block 604. As shown in block 605, the method includes performing the call connection procedure which includes sending the answer call message. In addition, the process includes continuing saving the samples, namely the preconnection audio information, while the answer call message is being generated. As shown in block 606, the process includes subsequently sending the stored preconnection audio information as post connection audio information after the answer call message has provided a suitable connection.

Referring again to block 602, if the amplitude is not increasing above the upper threshold, the process includes determining if the amplitude is below a lower threshold as shown in block 603. If so, the process includes continuing to monitor the microphone. However, if the amplitude is less than the upper threshold but not lower than the lower threshold, the process includes continuing to save input audio samples.

Accordingly, the disclosed wireless communication apparatus and communication methods allow samples to be taken and saved during an amplitude increase and be sent as the greeting information to the calling party. Another embodiment uses a set of key word greetings that are recorded and stored, for example, in telephone appliance memory. When a call is received, a user speaks a greeting which is preconnection audio information, which is saved and compared to the key words in memory. If the greeting is recognizable as a key word, the call is automatically answered and the greeting is sent to the calling party when the call is connected. The greeting may be recognized as having a key word when the key word is only partially spoken. This can reduce the delay in starting to send the greeting to the calling party. For example, the first word spoken in a greeting may be recognized as a command to initiate answering the call. The command is also sent to the calling party as the greeting.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. An audio activatable portable wireless communication device comprising:
    a user generated audio signal receiver;
    a user generated audio signal memory coupled to the user generated audio signal receiver;
    an answer call message generator coupled to the user generated audio signal memory; and
    a user generated audio signal transmitter coupled to the user generated audio signal memory;
    wherein a user generated audio signal is stored in the user generated audio signal memory in response to an incoming call.

2. The audio activatable portable wireless communication device of 1, the answer call message generator for generating an answer call message that completes the incoming call in response to the user generated audio signal, and
    the user generated audio signal transmitter for transmitting the stored user generated audio signal after the incoming call is completed.

3. The audio activatable portable wireless communication device of 1 further comprising an incoming call detector and an incoming call user alert.

4. An audio activatable portable wireless communication device comprising:
    a user generated audio signal receiver;
    a speech recognizer coupled to the user generated audio signal receiver;
    a user generated audio signal memory coupled to the user generated audio signal receiver;
    an answer call message generator coupled to the user generated audio signal memory; and
    a user generated audio signal transmitter coupled to the user generated audio signal memory;
    wherein a user generated audio speech is stored in the user generated audio signal memory in response to an incoming call.

5. The audio activatable portable wireless communication device of 4, the speech recognizer for determining whether the user generated audio speech is recognizable, the answer call message generator for generating an answer call message that completes an incoming call in response to the user generated audio speech being recognized by the speech recognizer, and the user generated audio signal transmitter for transmitting the stored user generated audio speech after the incoming call is completed.

6. The audio activatable portable wireless communication device of 4 further comprising an incoming call detector and an incoming call user alert.

7. A method in an audio activatable wireless portable communication device for completing an incoming call comprising steps of:
    detecting the incoming call;
    providing an incoming call user alert in response to detecting the incoming call;
    receiving a user generated audio signal in response to the incoming call;
    storing the user generated audio signal in memory in response to the incoming call;
    completing the incoming call; and
    sending the stored user generated audio signal after completing the call.

8. The audio activatable portable wireless communication device of claim 3 further comprising:
    an audio transducer coupled to an incoming call user alert to output an audio alert in response to the incoming call; and
    a filter operatively coupled to filter the audio alert from the user generated audio signal and to output a filtered user generated audio signal.

9. The audio activatable portable wireless communication device of claim 1, the answer call message generator for generating an answer call message in response to a detection of an increase in a user generated audio signal amplitude.

10. The audio activatable portable wireless communication device of claim 1, the user generated audio signal memory having stored audio greeting information that is compared to at least a portion of the stored user generated audio signal to determine whether to send the answer call message.

11. The audio activatable portable wireless communication device of claim 1, the user generated audio signal memory having stored audio greeting information that is compared to all of the stored user generated audio signal to determine whether to send the answer call message.

12. The audio activatable portable wireless communication device of claim 1, the answer call message and the user generated audio signal being combined as a common message.

13. The audio activatable portable wireless communication device of claim 1 the user generated audio signal serving as the answer call message.

14. The audio activatable portable wireless communication device of claim 4 further comprising:
    an audio transducer coupled to an incoming call user alert to output an audio alert in response to the incoming call; and a filter operatively coupled to filter the audio alert from the user generated audio signal and to output a filtered user generated audio signal.

15. The audio activatable portable wireless communication device of claim 4, the user generated audio signal memory having stored audio greeting information that is compared to at least a portion of the stored user generated audio speech to determine whether to send the answer call message.

16. The audio activatable portable wireless communication device of claim 4, the user generated audio signal memory having stored audio greeting information that is compared to all of the stored user generated audio speech to determine whether to send the answer call message.

17. The method of claim 7 further comprising steps of:
   generating an audio alert in response to the incoming call; and
   filtering the audio alert from the user generated audio signal.

18. The method of claim 7 further comprising a step of generating an answer call message in response to a detection of an increase in a user generated audio signal amplitude.

19. The method of claim 7 further comprising steps of:
   storing an audio greeting information; and
      comparing the stored audio greeting information to at least a portion of the stored user generated audio signal to determine whether to send the answer call message.

20. The method of claim 7 further comprising steps of:
   storing an audio greeting information; and
      comparing the stored audio greeting information to all of the stored user generated audio signal to determine whether to send the answer call message.

* * * * *